United States Patent Office 3,387,042
Patented June 4, 1968

3,387,042
BUTYL NITROPHENOLS
Warren W. Kaeding, Concord, Calif., assignor to The Dow Chemical Company, Midland, Mich., a corporation of Delaware
No Drawing. Original application Dec. 4, 1961, Ser. No. 156,982. Divided and this application Aug. 23, 1965, Ser. No. 505,199
2 Claims. (Cl. 260—622)

This is a division of my application Ser. No. 156,982, filed Dec. 4, 1961, now abandoned.

The present invention is concerned with meta tertiarybutyl nitrophenols and is particularly directed to 3-tertiarybutyl nitrophenols corresponding to the formula

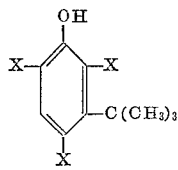

In this and succeeding formulas in the present specification and claims, at least one of the symbols X represents a nitro substituent.

These compounds are plate yellow to bright yellow liquids or crystalline solids at room temperature: are soluble in many common organic solvents such as diethyl ether and dichloromethane; less readily soluble in liquid aliphatic hydrocarbons and of very limited solubility in water. The compounds are useful as parasiticides and are especially adapted to be employed to control such parasites as insects which damage agricultural crops, fungi which occasion plant diseases and the spoilage of many materials such as wood, leather, fabric and the like; microorganisms which cause disease in warm-blooded animals; and for the control of soil-dwelling nematodes. Also, certain of the compounds are of toxicity to plants so low, and toxicity to insects so high that they are useful as systemic insecticides. The compounds are also useful as herbicides.

The compounds are readily prepared by the nitration of meta tertiarybutyl phenol with nitric acid. The reaction is moderately to strongly exothermic and is advantageously carried out in the presence of means to remove excess heat of reaction. The reaction goes forward with the elimination of the elements of water, and is expedited by the presence, in the reaction mixture, of an agent for the removal of water. Such agent may be the liquid reaction medium itself.

Maintaining the desirable reaction temperature is facilitated if the reactants to be combined, together with solvents and the like, are brought to the reaction mixture chilled.

The reaction goes forward promptly with instantaneous formation of at least some of the desired product; the reaction is carried to completion without undue delay. Upon completion of the reaction, the desired product is separated from the reaction mixture in manners which, in view of the present specification, will be apparent to those skilled in the art. Thus, if the reaction medium (which may also be a dehydrating agent) is water-miscible, the entire reacted mixture may be poured into ice water whereupon the desired product separates as an insoluble oil or solid and may be separated by gravity separation, and like methods. Also, fractional crystallization, distillation, and the like may be used.

In carrying out the reactions to prepare the novel compounds, a reaction medium of choice is glacial acetic acid. By its progressive hydration, this substance acts as the dehydrating agent which expedites the present reaction. When a more vigorous dehydrating action is desired, part or all of the liquid reaction medium may be acetic anhydride.

The nitric acid to be employed should desirably be of not less than normal concentration, and may be much stronger, up to many times normal. The use of fuming nitric acid, while not necessary, is practicable. Those skilled in the art will understand that the use of fuming nitric acid introduces less water than does the use of ordinary nitric acid, per equivalent of nitro radical introduced upon the meta tertiarybutylphenol nucleus.

While in general, reaction temperatures should preferably be low, that is to say within ten degrees, more or less of 0° C., no serious harm results when reaction temperatures briefly rise substantially higher.

The desired reaction, in laboratory quantities, usually goes to completion to a satisfactory degree in a matter of a few minutes, such as from 2 to 20 minutes. Typically, about 5 minutes is satisfactory. Thereafter, the desired product is removed in any of various methods. In one method, the entire reaction mixture is diluted with ice water whereupon the product is thrown out of solution in the water-acid mixture and may be separated as by decantation, filtration, in a separatory funnel, or the like. If desired, the aqueous phase may be further solvent-extracted to remove dissolved traces of desired product although the products of the present invention are of such low water solubility as to render such step usually not particularly advantageous.

The separated product may be purified further if desired. In one such method, it is dissolved in a solvent such as dichloromethane, in which the resulting solution is water-washed to remove traces of water-soluble impurities and then dried over, for example, anhydrous magnesium sulfate. From the resulting dried solution, solvent may be vaporized and removed and, when product is liquid, may be further distilled, as under subatmospheric pressure, to obtain a highly purified product. Such distillation is advantageously carried out by the use of a condenser, vertically oriented, made with body tube obstructions consisting of large hemispherical indentations and small sharp point indentations extending to the center of the body tube, whereby lighter fractions of the rising vapors condense and run down the side of the column where they meet one of the pointed indentations, run out to its tip and fall off onto the hemispherical indentation on the opposite side, there to spread over the surface and provide expanded contact with rising vapors whereby to give a washing effect. Such distillation head is commonly known as a Vigreaux column. However, other distillation heads may be used if desired.

When the desired product is a solid, it may be purified, if desired, by fractional crystallization as from an aliphatic hydrocarbon solvent in which it is relatively soluble when hot and relatively insoluble when cold.

The following examples illustrate the present invention but are not to be construed as limiting thereof:

EXAMPLE 1

A solution was prepared consisting essentially of 230 grams of meta tertiarybutyl phenol dissolved in 150 grams of glacial acetic acid. A second solution was prepared consisting essentially of fuming nitric acid dissolved in 400 milliliters glacial acetic acid, the fuming nitric acid being of an amount equimolecular (HNO₃ basis) with the meta tertiarybutylphenol. Both said solutions were thoroughly chilled and the meta tertiarybutylphenol solution was placed in a flask over a liquid bath cooled with Dry Ice to provide external refrigeration.

The fuming nitric acid was added thereto slowly, portionwise and with stirring, to effect the nitration of the meta tertiarylbutylphenol. During and after the course of addition, a maximum temperature of 5° C. was reached. Upon completion of the addition of the nitric acid solution to the meta tertiarybutylphenol solution, both in glacial acetic acid, the resulting reaction mixture was diluted with abundant ice water whereupon an oily layer separated. The oily layer was dissolved in dichloromethane, and the dichloromethane solution separated by gravity from the aqueous layer. The separated dichloromethane product solution was washed repeatedly with water, and thereafter dried over magnesium sulfate. Dichloromethane solvent was vaporized and removed and the remaining oily layer was distilled from a modified Claisen flask under a 12 inch Vigreaux column and from the resulting distillation there were separated several products; about 125 grams of a low-boiling liquid product with a green cast was 2-nitro-5-tertiarybutylphenol boiling at 140° C. under 10 millimeters pressure, absolute; also about 40 grams of 3-tertiarybutyl-4-nitrophenol boiling at 141° C under 1 millimeter pressure was separated as an orange oil. The structures were assigned on the basis of infrared analyses.

EXAMPLE 2

A solution consisting essentially of 100 grams of m-t-butylphenol (.67 mole) dissolved in 100 milliliters of glacial acetic acid was treated with 370 milliliters of 3-normal nitric acid dissolved in glacial acetic acid. The reaction was carried out slowly, portionwise with stirring, and over refrigeration. The temperature of the resulting reaction mixture rosce, for a short period of time, to 50° C. but was rapidly reduced thereafter by refrigeration to approximately 10° C. and maintained thereat for the remainder of the reaction period. Upon completion of the addition, the resulting reaction mixture was allowed to stand for 5 minutes with stirring. Thereafter the resulting mixture was added to a large excess of ice water and as a result it separated into an oily product phase and an aqueous phase. The product phase was separated by gravity and water washed, dehydrated, and thereafter distilled. A fraction distilling in the range of 164 to 171° C. under from 4 to 5 milliliters mercury pressure absolute solidified upon cooling to a crystalline solid. This solid was taken up in small amount of ether, and the ether solution diluted with pentane, whereupon brilliant yellow flat crystalline plates separated therefrom. These plates melted at 125–127° C. Thereupon, the said yellow flat plates were again recrystallized from hexane to obtain brilliant yellow, thin flat plates melting at 128–130° C. This fraction consisted essentially of 2,4-dinitro-5-tertiarybutylphenol. It was determined to have an equivalent weight of 239 as compared with a formula weight of 240.22 and nitrogen content of 11.29 percent as compared with a theoretical nitrogen content of 11.66 percent. The structure was assigned on the basis of infrared analysis.

EXAMPLE 3

100 grams of meta tertiarybutylphenol in 100 milliliters of glacial acetic acid was nitrated with 540 milliliters of 3-normal nitric acid dissolved in glacial acetic acid, the nitrification carried out over refrigeration. During the combination of the reactants, the temperature of the reaction mixture reached 50° C. for a short period of time and thereafter cooled to temperatures in the general range of 0° C. Upon the completion of the combining of the reactants, the resulting solution was allowed to stand for 45 minutes during which time the reaction went to completion, with a temperature rise of from a starting temperature of about 10° C. to an upper limit temperature of 37° C. The resulting mixture was diluted with ice water and an oily layer recovered, dissolved in dichloromethane, washed with water, dehydrated and thereafter fractionally distilled in the manner hereinbefore described. The resulting solid products were taken up in diethyl ether and repeatedly fractionally recrystallized from pentane and hexane. As a result of these procedures, there was obtained a 2,6-dinitro-3-tertiarybutylphenol having an equivadent weight of 237 as compared with a formula weight of 240.22, nitrogen contents of 11.41 percent as compared with theoretical 11.66 percent. The melting temperature was 62–63° C., the product was in the form of coarse triangular yellow crystals which were soluble in pentane and relatively less soluble in hexane.

A fraction separated by fractional crystallization was in the form of fine, pale yellow needle crystals having a melting temperature of 163° C., and equivalent weight determined to be 238 as compared with a formula weight of 240.22; and a structural formula, as confirmed by infrared data, of 2,4-dinitro-3-tertiarybutylphenol. The product was insoluble in pentane.

EXAMPLE 4

25 grams of meta tertiarybutylphenol was dissolved in 100 milliliters glacial acetic acid and the resulting solution was reacted with 250 milliliters of 3-normal nitric acid also dissolved in glacial acetic acid. Upon completion of the combination of the reactants, the resulting reaction mixture was gently heated until reflux began and maintained under reflux for 15 minutes to carry the reaction to completion. Upon completion of the period of boiling under reflux, the resulting reaction mixture was diluted in a large excess of ice water whereupon an oily product layer separated from an aqueous phase. A cream colored 2,4,6-trinitro-3-tertiarybutylphenol product solid developed as a product layer and was removed by filtration and washed with water. The solid was recrystallized from isooctane solution, to obtain 28 grams of a purified product melting at 172° C. The product had an equivalent weight of 286 as compared with a theoretical equivalent of 285.2 and had contents of nitrogen, carbon and hydrogen of 13.52, 42.46 and 3.76 respectively, as compared with theoretical values of 14.73, 42.10 and 3.89, all expressed as percent by weight of the total weight of product infrared analysis confirmed the assigned structure of 2,4,6-trinitro-3-tertiarybutylphenol.

It has been established that the compounds of the present invention are useful for the control of many noxious insects, including southern army worm, bean aphid, houseflies, confused flour beetle, American cockroach, and others. Also, the compounds are useful for the control of certain arachnids such as the 2-spotted spider mite. Others of the compounds are useful in the control of such weed pests as members of the mustard family, weedy grasses, and the like. In particular, the application to host plants upon which a population of southern army worm larvae was actively feeding, of a spray to run-off containing 2 pounds of 2,4-dinitro-5-tertiarybutylphenol per 100 gallons of resulting aqueous preparation gave a 100 percent kill of the said army worm larvae. A similar spray applied to host plants upon which was feeding a heavy population of *Tetranychus bimaculatus* resulted in a 100 percent kill of the said spider mite. Also, 2,4-dinitro-3-tertiarybutylphenol at a relatively low rate gave complete kill of canary grass.

I claim:
1. 4-nitro-3-tertiarybutylphenol.
2. 2-nitro-5-tertiarybutylphenol.

References Cited

UNITED STATES PATENTS 2,207,727    7/1940    Galloway _____ 260—622

LEON ZITVER, *Primary Examiner.*

W. B. LONE, *Assistant Examiner.*